No. 833,701. PATENTED OCT. 16, 1906.
J. STRAIT, J. BRAHM & E. E. STRAIT.
MOLD.
APPLICATION FILED OCT. 13, 1905. RENEWED SEPT. 1, 1906.
3 SHEETS—SHEET 1.
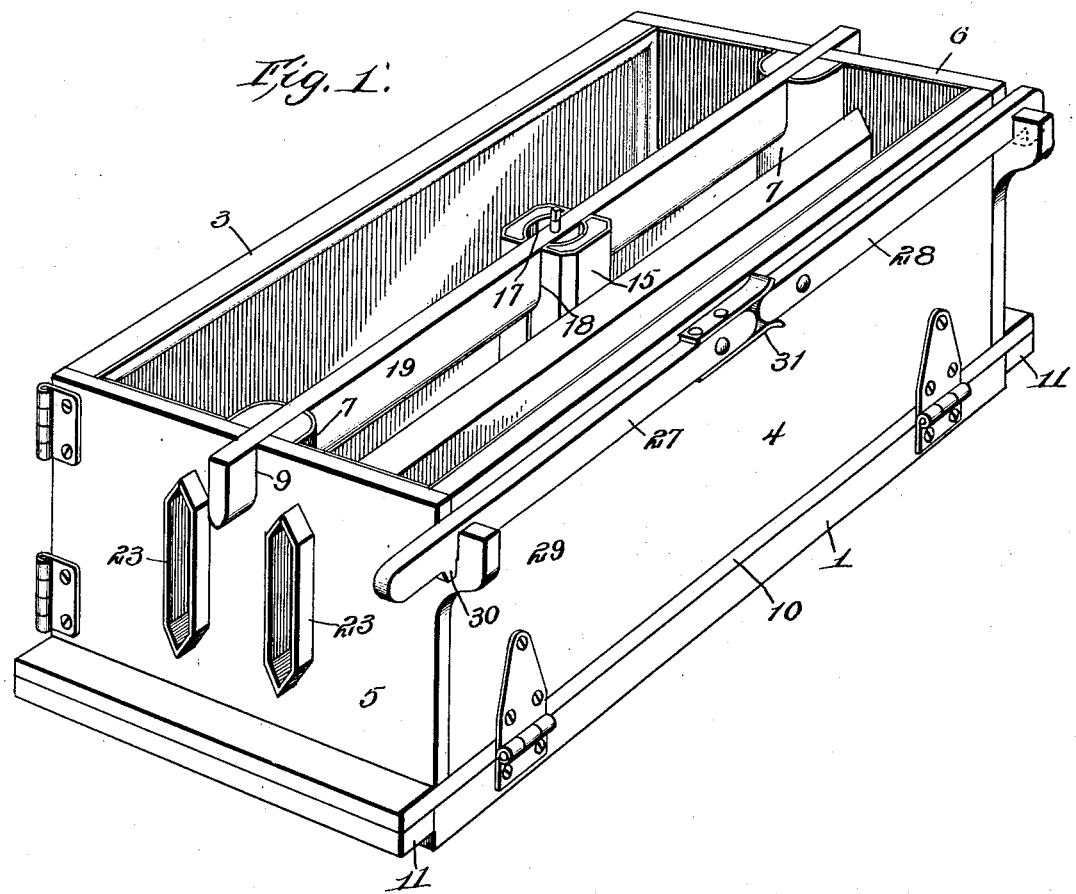
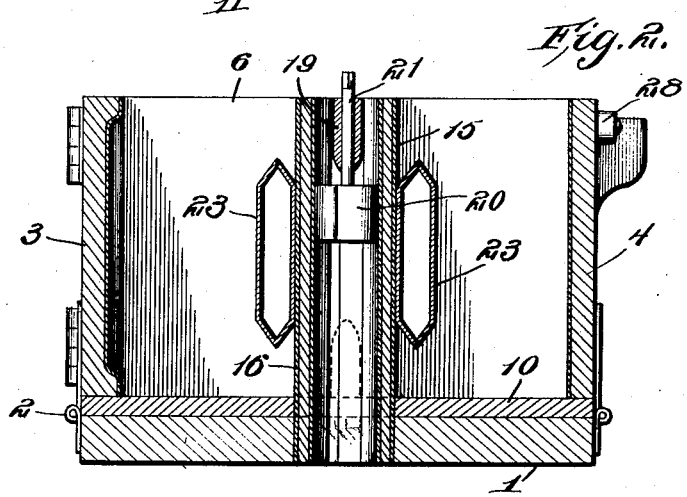
Witnesses
Louis R. Heinrichs
Herbert D. Lawson
Inventors
John Strait
Jakob Brahm
Elmer E. Strait
By W. J. FitzGerald & Co.,
Attorneys No. 833,701. PATENTED OCT. 16, 1906.
J. STRAIT, J. BRAHM & E. E. STRAIT.
MOLD.
APPLICATION FILED OCT. 13, 1905. RENEWED SEPT. 1, 1906.
3 SHEETS—SHEET 2.
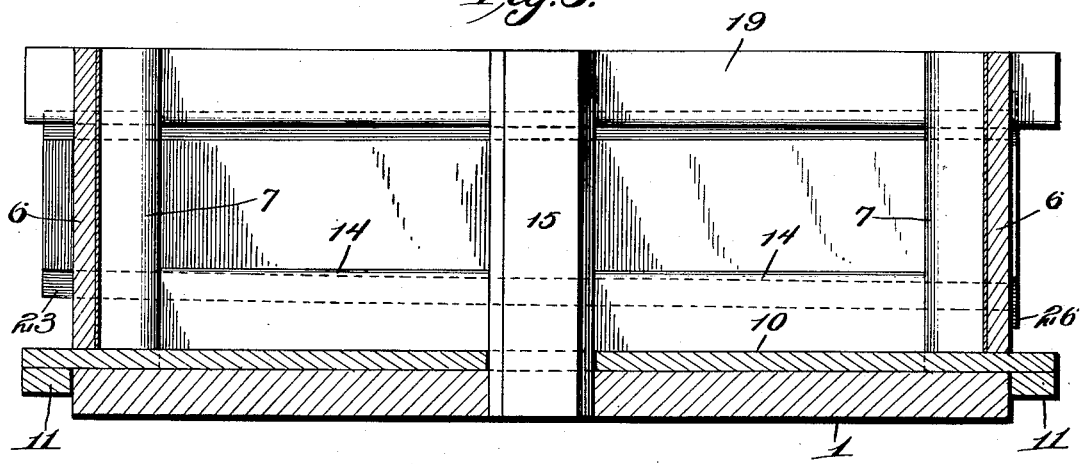
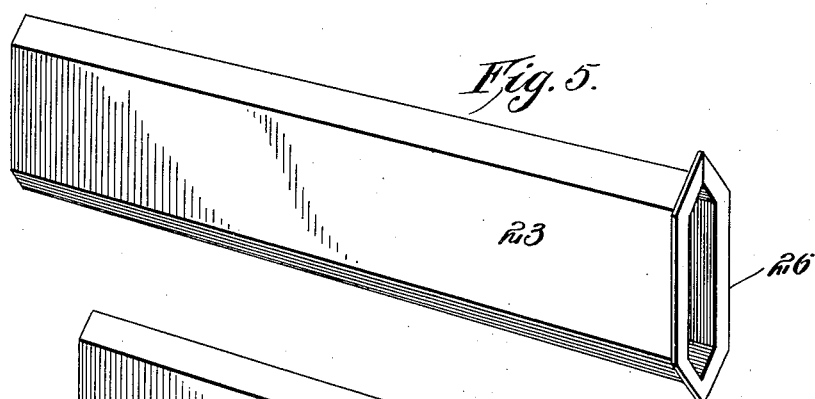
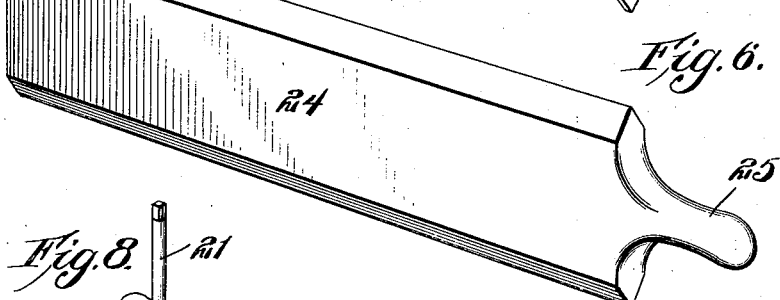
Witnesses
Louis R. Heinrichs
Herbert D. Lawson
Inventors
John Strait
Jakob Brahm
Elmer E. Strait
By W. J. FitzGerald & Co.,
Attorneys

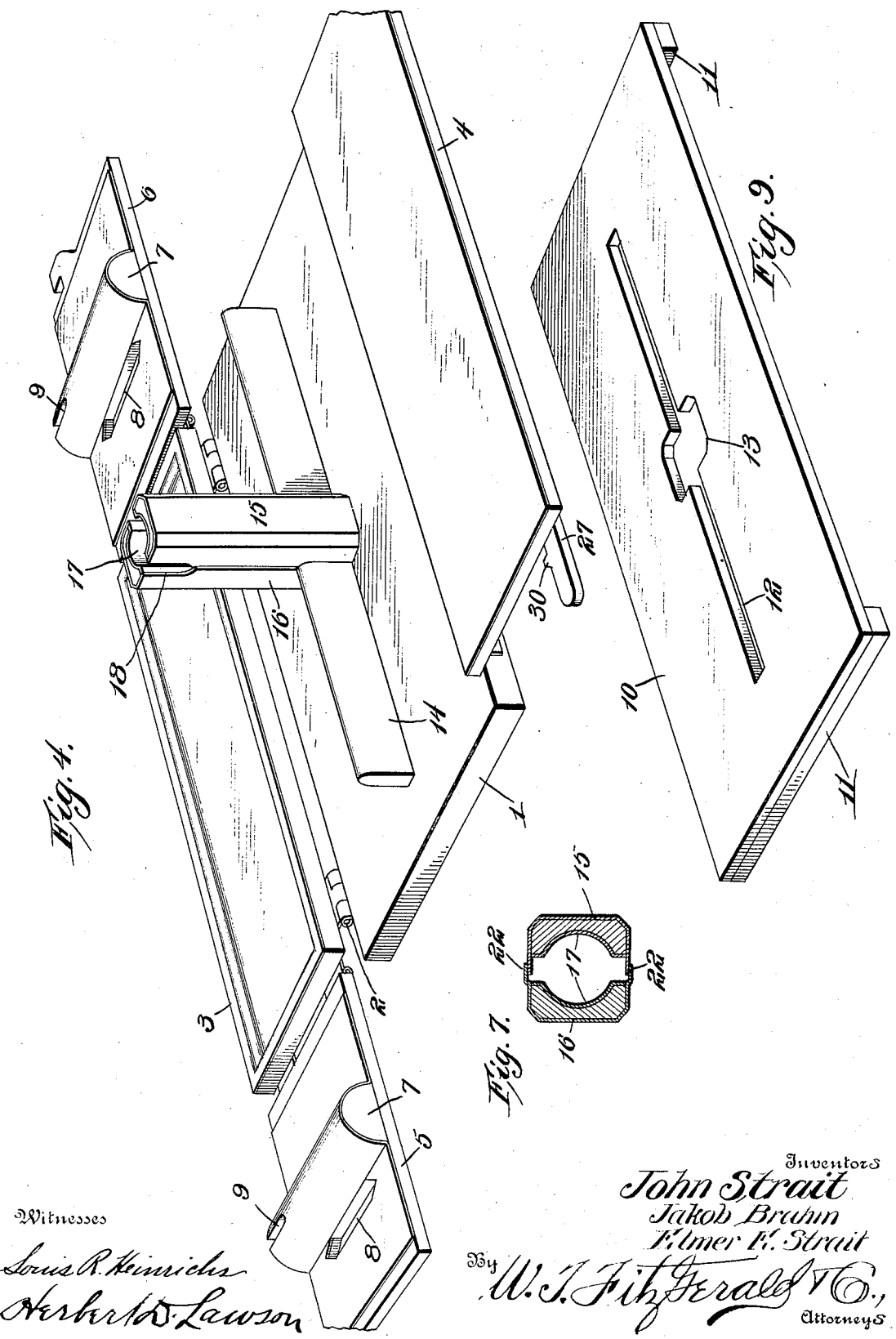

UNITED STATES PATENT OFFICE.

JOHN STRAIT, JAKOB BRAHM, AND ELMER E. STRAIT, OF ROCK RAPIDS, IOWA; SAID JOHN STRAIT ASSIGNOR TO SAID ELMER E. STRAIT AND SAID JAKOB BRAHM.

MOLD.

No. 833,701.  Specification of Letters Patent.  Patented Oct. 16, 1906.

Application filed October 13, 1905. Renewed September 1, 1906. Serial No. 332,995.

*To all whom it may concern:*

Be it known that we, JOHN STRAIT, JAKOB BRAHM, and ELMER E. STRAIT, citizens of the United States, residing at Rock Rapids, in the county of Lyon and State of Iowa, have invented certain new and useful Improvements in Molds; and we do hereby declare the following to be a full, clear, and exact description of the invention, such as will enable others skilled in the art to which it appertains to make and use the same.

Our invention relates to molds for producing building-blocks and the like formed of artificial stone.

The object of the invention is to provide a mold the walls of which can be readily opened outward, so as to free the sides of the block.

Another object is to provide cores which are so disposed as to produce within the block longitudinally-extending passages communicating with a transversely-extending passage, said transversely-extending passage also communicating with recesses formed in opposite faces of the block.

Another object is to so construct the longitudinally and transversely extending cores as to permit them to be collapsed prior to the withdrawal thereof from the molded block.

With the above and other objects in view the invention consists of a mold comprising a base to which are hinged side walls. The end walls are hinged to the ends of one of the side walls, and a lock of peculiar form is connected to the other side wall for the purpose of securing all portions of the mold in closed position. A pallet is adapted to be placed upon the base and below the side and end walls, and extending through this pallet is a collapsible central core from the bottom of which extend blades which are adapted to form a groove or channel in the bottom of the block. Another strip extends longitudinally of the center of the mold at the top thereof, and to each side of the central core are arranged collapsible longitudinally-extending cores.

The invention also consists of providing peculiar means for holding the cores against collapsing during the molding operation, but which enables said cores to be readily contracted for the purpose of withdrawing them.

The invention also consists of further novel features of construction and combination of parts, which will be hereinafter more fully described, and pointed out in the claims.

In the accompanying drawings we have shown the preferred form of our invention.

In said drawings, Figure 1 is a perspective view of our improved mold. Fig. 2 is a central vertical transverse section therethrough. Fig. 3 is a central vertical longitudinal section therethrough. Fig. 4 is a perspective view showing the mold open. Fig. 5 is a detail view of one of the longitudinal cores. Fig. 6 is a perspective view of the wedge used with said core. Fig. 7 is a transverse section through the central core. Fig. 8 is a detail view of its holding device, and Fig. 9 is a perspective view of the pallet.

Referring to the figures by numerals of reference, 1 is a base to opposite sides of which are secured hinges 2. Two of these hinges are connected to one of the side walls 3 of the mold, while the other hinges are connected to the other side wall 4. End walls 5 and 6 are hinged to the ends of wall 3 and have vertical extensions 7 on their inner faces adjacent the center thereof, at opposite sides of which are formed elongated slots 8. The upper edges of the end walls and the adjoining walls of extensions 7 are recessed or slotted, as shown at 9.

A pallet 10, in the form of a board having end cleats 11 depending therefrom, is adapted to be placed on the base 1 and has a longitudinally-extending slot 12, at the center of which is an enlarged opening 13. This pallet is adapted to be placed on the base and to be overlapped by the walls of the mold when the mold is closed. The slot 12 receives blade-sections 14, which are located upon the base 1 and extend longitudinally thereof. The opening 13 receives my improved collapsible central core. This core consists of oppositely-disposed similar sections 15 and 16, the outer surfaces conforming in contour with the passage which it is desired to produce within the molded block. The sections have their adjoining faces channeled longitudinally, as shown at 17, and both sections extend at their lower ends between the blade-sections 14 and have recesses 18 at their upper ends which register to form slots. These slots are adapted to receive a strip 19, which extends longitudinally of the mold and is detachably seated within the recesses 9 in the end walls thereof. The sections 15 and 16 are capable of moving laterally in relation to each other, and interposed between them is an S-shaped cam 20, having a stem 21, which is adapted to extend through the strip 19 and is rotatable therein. By rotating this cam the sections 15 and 16 can be pressed apart, and by returning it to its normal position said sections can be pressed together. Both sections are preferably covered with sheet metal, so that overlapping flanges 22 can be formed at their adjoining edges. Located longitudinally within the mold, with their ends seated in the openings 8, are flat tubular cores 23, which are slit longitudinally and preferably formed of sheet metal. Each of these cores is adapted to receive a wedge 24, which when pressed thereinto will expand it and when withdrawn will permit it to collapse. Each wedge has a handle 25 for facilitating its manipulation, and a flange 26 is formed at one edge of each core 23 for limiting its longitudinal movement when the wedge 24 is inserted thereinto.

The wall 4 of the mold has oppositely-extending locking-strips 27 and 28 pivoted thereto, and each of these strips engages an ear 29, extending from the end walls of the mold. Lugs 30 are formed on the strips, so as to hold the end walls against the side wall 4; and oppositely-disposed spring-strips 31 are secured to the strip 27 and adapted to overlap the adjoining end strip 28, so that both of the strips will swing in unison when either is raised or lowered.

In using the mold herein described the pallet 10 is placed upon the base and the walls are then placed in position over the edges thereof and secured by means of strips 27 and 28. The expanding-cam 20 is then placed in the central core, and its stem 21 is placed within the strip 19, which in turn is inserted in the recesses 9 and slots 18. Cores 23 are then placed within openings 8 and their wedges inserted. Said cores 23, as well as the central core, are then expanded by the devices therein, after which the cement of which the block is to be formed is placed within the mold and suitably tamped. After this operation has been completed the strip 19 is removed and wedges 24 are withdrawn. The cores 23 will therefore collapse to a certain extent and can be readily withdrawn without injuring the adjoining portions of the block. The end walls are then released from strips 27 and 28, after which all of the walls of the mold are swung away from the block. Cam 20 is then rotated, so as to permit the contraction of the central core, and the pallet 10 is subsequently raised and will lift the block off of the central core and the blade-sections 14.

By providing a mold such as herein described a block can be quickly formed of artificial stone and after being so formed can be removed from the mold without being in any wise injured by the cores or other portions of the molding device.

Having thus fully described our invention, what we claim as new, and desire to secure by Letters Patent, is—

1. A core for molds consisting of oppositely-disposed detached sections, sheet-metal coverings therefor terminating in flanges adapted to overlap, and means interposed between the sections for spreading them apart.

2. A core for molds consisting of oppositely-disposed detached sections, sheet-metal coverings therefor terminating in flanges adapted to overlap, and rotatable means interposed between but detached from the sections for spreading the core.

3. A mold for producing blocks having communicating longitudinal and transverse passages therein, said mold comprising a base and walls hinged thereto, a central collapsible core extending from the base, alining wings extending from opposite faces of the core and upon the base, a strip removably mounted upon the core and parallel with the wings, extensions upon opposite walls of the mold contacting with the wings and strip, and a core removably mounted within opposite walls and normally contacting with the first-mentioned core.

4. The combination with a mold comprising a base, side walls hinged thereto and end walls hinged to one of the side walls; of a sectional core extending from the base, expanding means interposed between the sections of the core, split tubular cores disposed within the mold, expanding devices movably mounted therein, a detachable strip extending between the sections of the central core, and winged sections upon the base and extending from the central core.

5. The combination with a mold comprising a base, side walls hinged thereto and end walls hinged to one of the side walls; of blade-sections upon the base, a sectional central core between the blade-sections and extending from the base, a rotatable expanding device interposed between the sections of the core, split tubular cores detachably mounted within the end walls, expanding devices within said cores, and a strip extending between the sections of the central core and detachably mounted within the end walls.

6. The combination with a mold comprising a base, side walls hinged thereto, end walls hinged to one of the side walls, and means for locking the end walls and side walls together; of blade-sections upon the base, a sectional core extending from the base and between the blade-sections, a slotted pallet upon the base and surrounding the blade-sections of the sectional core, said pallet adapted to be overlapped by the walls of the mold, expansible cores extending within the mold and detachably mounted within opposite walls, and expanding devices within all of the cores.

In testimony whereof we have signed our names to this specification in the presence of two subscribing witnesses.

JOHN STRAIT.
JAKOB BRAHM.
ELMER E. STRAIT.

Witnesses:
C. J. MILLER,
MABEL NORTON.